[19] United States Patent
Tolles et al.

[11] 4,155,878
[45] May 22, 1979

[54] PROCESS FOR MAKING ACTIVATED CARBON WITH CONTROL OF METAL ION CONCENTRATION IN PHOSPHORIC ACID

[75] Inventors: Edward D. Tolles, Charleston; Robert L. Stallings, Summerville; Charles E. Miller, Mt. Pleasant, all of S.C.

[73] Assignee: Westvaco Corporation, New York, N.Y.

[21] Appl. No.: 904,696

[22] Filed: May 10, 1978

[51] Int. Cl.$^2$ .................. C01B 31/12; B01J 21/18
[52] U.S. Cl. .................................. 252/423; 252/425
[58] Field of Search ............... 252/423, 425, 445, 447

[56] References Cited

U.S. PATENT DOCUMENTS

| 29,560 | 8/1860 | Belton | 252/425 |
|---|---|---|---|
| 1,250,228 | 12/1917 | Rule et al. | 252/425 |
| 1,286,187 | 11/1918 | Mumford | 252/425 |
| 1,383,755 | 7/1921 | Punnett et al. | 252/425 |
| 1,438,113 | 12/1922 | Hudson | 252/423 |
| 1,502,592 | 7/1924 | Sauer | 252/425 |
| 1,505,496 | 8/1924 | Rohde | 252/425 |
| 1,520,437 | 12/1924 | Pipkin | 252/447 |
| 1,520,801 | 12/1924 | Bonnard | 252/425 |
| 1,619,649 | 3/1927 | Bonnard | 252/425 |
| 1,788,466 | 1/1931 | Lourens | 252/423 |
| 2,008,145 | 7/1935 | Morrell | 252/421 |
| 2,441,125 | 5/1948 | Berl | 252/425 |
| 2,835,343 | 5/1958 | Wolff et al. | 252/447 |
| 3,066,099 | 11/1962 | Mohun | 252/445 |
| 3,168,485 | 2/1965 | Knobloch et al. | 252/444 |
| 3,479,300 | 11/1969 | Riven et al. | 252/430 |
| 3,492,244 | 1/1970 | Fujiwara et al. | 252/425 |
| 3,764,561 | 10/1973 | Nishino et al. | 252/425 |
| 3,835,064 | 9/1974 | Shinomiya et al. | 252/423 |
| 3,923,689 | 12/1975 | Boughton et al. | 252/444 |
| 3,950,267 | 4/1976 | Arakawa et al. | 252/425 |
| 4,075,282 | 2/1978 | Storp et al. | 252/444 |

Primary Examiner—Patrick Garvin
Assistant Examiner—P. E. Konopka
Attorney, Agent, or Firm—Ernest B. Lipscomb, III; Terry B. McDaniel

[57] ABSTRACT

A process for improvement of wood-base active carbon made in the presence of phosphoric acid is disclosed herein. The improvement comprises controlling the amount of dissolved salts of the group sodium, potassium, calcium and magnesium in the process acid to provide a metal ion concentration from 0.5% to 2.0% by weight. The controlled addition of these metal salts improves the adsorptivity for fuel vapors and the decolorizing activity of the carbon.

6 Claims, No Drawings

PROCESS FOR MAKING ACTIVATED CARBON WITH CONTROL OF METAL ION CONCENTRATION IN PHOSPHORIC ACID

BACKGROUND OF THE INVENTION (1) Field of the Invention

The present invention relates to a process for improving the properties of wood-base carbon activated in the presence of phosphoric acid. More particularly, this invention relates to controlling the amount of certain metal salts dissolved in the process acid.

(2) Description of the Prior Art

In the production of activated carbon from wood, sawdust is mixed with various chemical agents, carbonized and often subsequently activated by gas reactions. Wood-base carbons have been used for decolorizing by contacting solutions with the activated carbon. One such example appears in U.S. Pat. No. 1,383,755 wherein alkali metal sulfates were added to sawdust and other materials to assist in activation. Another use for carbons is in the gas phase for adsorption of hydrocarbon vapor. An example of this type of carbon is described in U.S. Pat. No. 3,764,561.

These and other patents have sought to improve one adsorbing property or another using varied techniques including the application of metal salts. The use of such metals is generally characterized by large proportions of salt relative to the wood, high temperatures (around 1,800° F.), and frequently contact with oxidizing gases at 1,500°–1,800° F.

Activated carbon can also be made from wood by carbonizing it in the presence of phosphoric acid at temperatures around 800°–1,300° F. It has now been found that by controlling the amount of certain dissolved metals in this process acid during heat treatment, activated carbons having desirable decolorizing ability and desirable gas adsorbing ability, or both, may be obtained.

It is, therefore, the general object of this invention to provide a process for improving the decolorizing ability and the gas adsorbing ability of wood-base activated carbon produced in the presence of phosphoric acid.

Another object of this invention is to provide an improved process for producing wood-base activiated carbon by controlling the amount of dissolved metal salt in the process acid during activation.

Other objects, features, and advantages will be evident from the following detailed description of the invention.

SUMMARY OF THE INVENTION

It has been found that controlling the amount of dissolved metal salts from the group consisting of sodium, potassium, magnesium, calcium and mixtures thereof in the process acid to provide a metal ion concentration between 0.5% and 2.0%, preferably 0.6% to 1.0%, by weight of acid improved the adsorbing activity for both decolorizing and gas phase adsorption.

DETAILED DESCRIPTION OF THE INVENTION

In the production of activating carbon, a suitable granulated cellulosic source material such as sawdust, ground wood, pulp or bark is saturated with phosphoric acid and simultaneously carbonized and activated at 800° F. to 1,300° F., preferably 1,000° F. to 1,050° F., for approximately 15 minutes to 1 hour in an activation furnace to drive off volatiles.

Following furnace activation, the activated carbon containing residual phosphoric acid is washed with water to remove this acid and the carbon product is subsequently dried.

The wash water is retained and evaporatively concentrated for acid recovery and recycle. This acid carries with it certain metal ions extracted from the wood; and with repeated use, metal concentrations gradually increase in this acid.

In the activation of sawdust at an optimum temperature of about 1,000° F., the phosphoric acid probably serves to protect against cracking or disproportionation of cellulosic or other components of the wood which would produce small molecular groups tending to evaporate as vapors or tars. As carbonization proceeds under these conditions, the wood material undergoes structural changes ultimately resulting in a high-porous activated carbon.

It was found that the adsorption properties of the activated product are highly dependent upon the concentration of dissolved $Na^+$, $K^+$, $Mg^{++}$, and $Ca^{++}$ in the process acid. For example, as the concentration of these ions increases from 0% to at least 4% of the acid weight, the adsorptivity for fuel vapors as measured by the "Butance Working Capacity" (BWC) test monotonically decreases. Also, as the metal ion content increases from 0% to about 2–3%, (relative to the acid) the decolorizing ability increases as measured by the "Decolorizing Index" (DI) or Molasses Value (MV) test. As the concentration increases above this level, the decolorizing ability then decreases. The presence of these metal ions in the process acid can be the result of accumulative extraction from the wood itself or can be due to intentional addition of acid soluble metal salts.

Thus, a product showing satisfactory performance by both BWC and DI tests may be obtained by controlling the metal ion content in the process acid at concentrations between 0.5% and 2% relative to the acid. This is equivalent to about 0.35–1.4% relative to sawdust.

Experiments have shown that the carbon product using pure phosphoric acid has a very high "BWC." This is determined by a test which measures the amount of butane which can be purged from carbon with air under certain flow conditions after the carbon is presaturated with this vapor. This property is related to performance in fuel evaporation control. It is likely that good performance in this test results from the development of pores which are of optimum size for adsorption and desorption of butane under the test conditions. When even small amounts of such metal ions as $Na^+$, $K^+$, $Ca^{++}$, and $Mg^{++}$ are present, the resultant carbon shows poorer BWC. It is suspected that the metal ions catalyzed oxidation of the carbon material under the process conditions and enlarge the pores beyond the optimum size.

It is also believed that the decolorizing ability of the carbon increases because of this pore enlargement. According to this concept, the optimum pore size for liquid decolorization is larger than that for vapor phase BWC. This size is thought to be promoted under the process conditions by metal ion concentration of about 2–3%. At higher concentrations, the optimum is exceeded; and DI or MV is observed to decrease.

The presence or absence of residual metals in the carbon product is not believed to affect adsorption significantly. For the most part, these metals are retained in the acid which is washed off. The importance of the metal is thought to lie in the effect of its ions on the activation mechanism.

In summary, it is believed that pore size development and associated adsorption properties are sensitive to the presence of critical amounts of the metal ions during carbonization/activation of wood by the action of phosphoric acid at temperatures between 800° F. and 1,300° F. Therefore, the adsorption properties related to BWC and DI can be controlled by controlling the amount of these metals present during activation.

In order to more clearly illustrate the present invention, the following example is set forth:

EXAMPLE

Sawdust at 42% moisture content was mixed with phosphoric acid at an acid to sawdust ratio of 1.4:1. The amount of potassium ions in the phosphoric acid was measured by a Model 330 Perkin-Elmer Atomic Adsorption Spectrophotometer. The activating temperature was 1,050° F. at a residence time of 45 minutes. The purpose of this run was to see if the DI could be increased while still maintaining BWC above 9.0. It was found that when the concentration of potassium ion was maintained between 0.5% and 2.0% that the BWC remained above 9 and the DI was between 14 and 32.5.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. In a process for producing wood-base active carbon by the steps of treating a wood material with phosphoric acid at a temperature between 800° F. and 1,300° F. and recovering and recycling the phosphoric acid wherein the wood material contains one or more salts selected from the group consisting of sodium, potassium, calcium and magnesium salts and mixtures thereof, the improvement comprising maintaining the concentration in the phosphoric acid of metal ions from the group consisting of sodium, potassium, calcium and magnesium between 0.5% and 2.0% by weight of the acid.

2. The process according to claim 1 wherein the activating temperature is between 1,000° F. and 1,050° F.

3. The process according to claim 1 wherein sawdust is the starting material for said wood-base carbon.

4. The process according to claim 1 wherein the metal ion concentration in the phosphoric acid is maintained between 1.0% and 1.58%.

5. The process according to claim 1 wherein said metal ion is sodium.

6. The process according to claim 1 wherein said metal ion is potassium.

* * * * *

UNITED STATES PATENT AND TRADEMARK OFFICE
CERTIFICATE OF CORRECTION

PATENT NO. : 4,155,878
DATED : May 22, 1979
INVENTOR(S) : Edward D. Tolles, Robert L. Stallings and Charles E. Miller It is certified that error appears in the above-identified patent and that said Letters Patent are hereby corrected as shown below:

In column 1, line 46, "activiated" should read --activated--.

In column 2, line 27, "Butance" should read --Butane--.

In column 4, claim 4, line 25, "1.58%" should read --1.5%--.

Signed and Sealed this

Twelfth Day of May 1981

[SEAL]

Attest:

RENE D. TEGTMEYER

Attesting Officer  Acting Commissioner of Patents and Trademarks